M. J. GILLICE.
ARMOR FOR PNEUMATIC TIRES.
APPLICATION FILED MAR. 10, 1920.
1,373,881.
Patented Apr. 5, 1921.
2 SHEETS—SHEET 1.
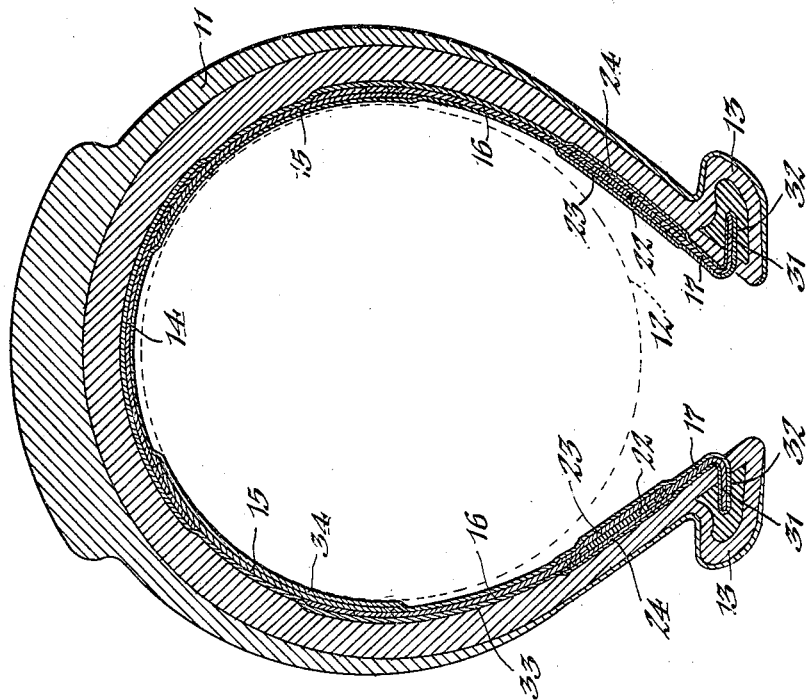
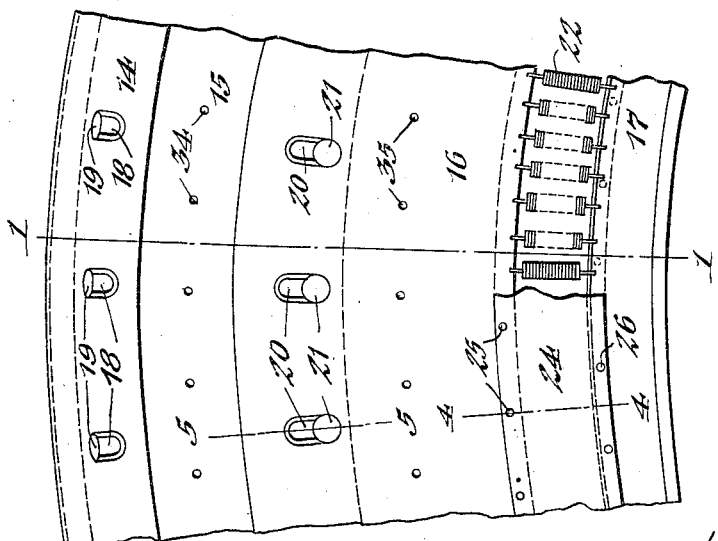
INVENTOR
Michael J. Gillice
BY Geyer Popp
ATTORNEY M. J. GILLICE.
ARMOR FOR PNEUMATIC TIRES.
APPLICATION FILED MAR. 10, 1920.
1,373,881.
Patented Apr. 5, 1921.
2 SHEETS—SHEET 2.
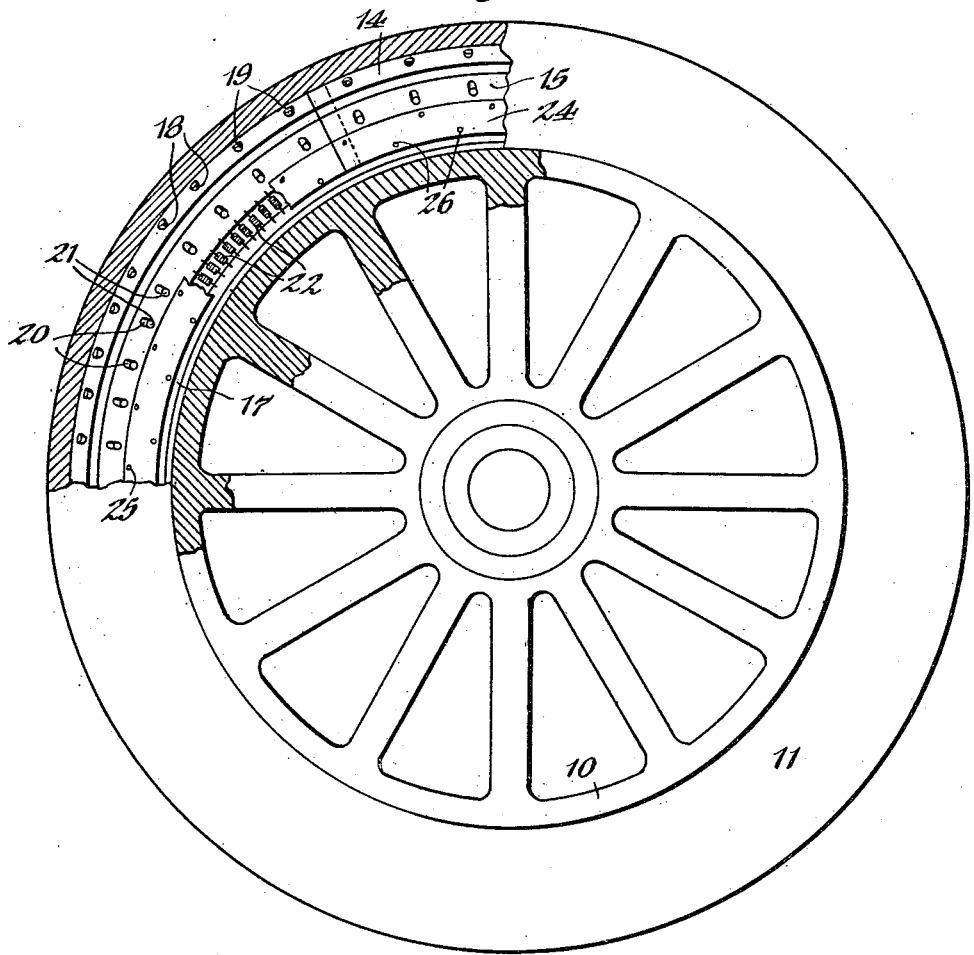
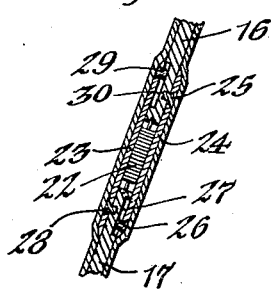
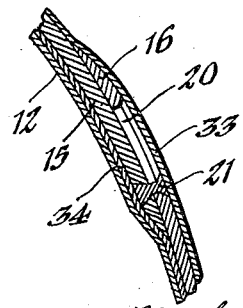
INVENTOR
Michael J. Gillice,
BY
ATTORNEY

UNITED STATES PATENT OFFICE.

MICHAEL J. GILLICE, OF BUFFALO, NEW YORK.

ARMOR FOR PNEUMATIC TIRES.

1,373,881.     Specification of Letters Patent.     Patented Apr. 5, 1921.

Application filed March 10, 1920. Serial No. 364,649.

*To all whom it may concern:*

Be it known that I, MICHAEL J. GILLICE, a citizen of the United States, residing at Buffalo, in the county of Erie and State of New York, have invented new and useful Improvements in Armor for Pneumatic Tires, of which the following is a specification.

This invention relates to pneumatic tires which are provided with a metallic armor for protecting the air tube from puncture by nails, tacks and other sharp objects.

One object of the invention is the provision of a relatively light armor of this character which possesses the requisite resiliency to render the tire comfortable and which at the same time is capable of freely following the expanding and contracting movements of the tire.

A further object is to so construct the armor as to facilitate the application of the tire to a wheel-rim and its removal therefrom.

In the accompanying drawings:

Figure 1 is a cross section of a tire embodying the improvement, the usual air tube being omitted and the plane of the section being on line 1—1, Fig. 2. Fig. 2 is a fragmentary side elevation of the armor, some parts thereof being omitted or broken away, to expose other parts. Fig. 3 is a side elevation, partly in section, of an automobile wheel equipped with the tire. Fig. 4 is a cross section on line 4—4, Fig. 2. Fig. 5 is a similar section on line 5—5, Fig. 2.

Similar characters of reference indicate corresponding parts throughout the several views.

10 indicates a vehicle wheel having the usual flanged rim and 11 the shoe of a pneumatic tire which receives the customary air tube 12 shown by dotted lines in Fig. 1. The shoe has the usual base flanges 13 adapted to interlock with the flanges of the wheel rim, in the usual manner.

Applied to the inner side of the shoe is the improved armor or lining for protecting the air tube from puncture. In the preferred embodiment of the invention shown in the drawings, the armor comprises an arched tread section or plate 14, a plurality of side plates or sections 15, 16, and base plates or sections 17. Adjoining portions of these side sections and the tread section overlap each other and are connected by slip joints which permit the sections to slide or telescope on each other laterally and radially of the wheel, as the tire expands and contracts in use. The several sections of the armor preferably extend continuously around the tire in the form of integral circular bands, so that the overlapping sections form a practically continuous shield or armor which lines the entire shoe and completely incloses the air tube, except at its base side where it is protected by the wheel rim.

Any suitable connections may be employed for telescopically joining the side-sections of the armor to each other and to the tread section 14. In the construction shown, the tread section is provided in its side or marginal portions with transverse or radially arranged slots 18 which receive headed studs 19 extending outwardly from the underlying side sections 15 of the armor, these studs being located at appropriate intervals and extending in a circular series around the armor. The second or inner side section 16 of the armor is united to the outer side section 15 by similar radial slots 20 and headed studs 21. These various studs are countersunk in grooves of the contiguous armor sections, so that their heads are flush therewith, as shown in Fig. 5. The base plates or sections 17 of the armor are separated from the adjacent side plates 16 by intervening annular spaces which receive extensible radial springs 22 connected at their ends to said adjacent plates to flexibly unite them. Coiled springs are preferable for this purpose, but any other suitable springs or flexible connections may be substituted for them. These connections are arranged at suitable intervals around the entire circle of the armor, and to protect them from injury and prevent their lateral displacement, they may be covered by annular strips 23, 24 applied to the inner and outer sides of the adjacent armor-plates. In the preferred construction shown, Fig. 4, each outer strip 24 is riveted at 25 to the adjacent side plate 16, and provided near its lower edge with suitably spaced stop-pins or studs 26 which engage in radial grooves 27 in the corresponding base-plate 17. Each inner covering strip 23 is riveted at 28 to the adjacent base-plate 17 and provided with similar stop-pins 29 which slide in radial grooves 30 in the corresponding side plate 16. These covering plates thus perform the double function of protecting the springs 22 and properly limiting the outward or expansive movement of the armor-sections.

As shown in Fig. 1, the base plates 17 are provided at their inner base edges with outwardly bent annular flanges 31 which are seated in annular slits or cavities 32 formed in the flanged base portions 13 of the shoe.

To protect the interior of the shoe as well as the exterior of the air tube from chafing, cutting or pinching by the lapped edges of the armor plates, the armor is covered on its outer side by a suitable fabric 33 and is lined on its inner side by a similar fabric 34, the fabric covering the base flanges 23 of the armor as well as its side and tread plates. This fabric should be sufficiently elastic to expand and contract with the armor plates as they move laterally and radially on each other in following the expanding and contracting movements of the tire. The fabric may be simply drawn over the armor and held in place against the inner sides thereof by the pressure of the inflated air tube, or if desired, the fabric may be sewed to the armor, in which case annular rows of holes 35, 36, are formed in the armor-plates.

The latter are constructed of relatively thin spring steel or other suitable material, in order to give the armor the necessary resilience to render the tire comfortable and easy-riding and at the same time reduce its weight. To avoid the formation of objectionable bulges or shoulders at the joints of the armor, the edges of its overlapping plates are beveled or tapered, as shown in Fig. 1. In the drawings the thickness of the plates and their joints are exaggerated for clearness of illustration, but in practice no such pronounced shoulders or offsets exist in the armor, but its inner surface is comparatively smooth throughout its area, so as to present a practically even bearing surface to the air tube.

In the use of the tire, upon inflating it, the armor is distended with the air tube and the springs or connections 22 are stretched. As the tire is alternately compressed and relaxed, the side plates of the armor slide on each other and on the tread section both sidewise and toward and from the wheel rim, permitting the tire to expand and contract like an ordinary pneumatic tire, practically without restraint, while at the same time effectually protecting the air tube from punctures. In order to facilitate the sliding action of the armor plates upon one another, the connecting studs 19, 21 may be lubricated with soap stone, oil or other suitable lubricant.

By connecting the base-sections 17 of the armor with the adjacent side sections 16 by springs or extensible connections 22, the base-sections are held in their proper position when the tire is in place on the wheel, while in applying the tire to the wheel and removing it therefrom said connections permit the requisite independent movement of the base sections with reference to the side sections to facilitate these operations.

The ends of the several circular bands or plates constituting the armor may be secured together in any suitable manner or by any suitable means, but they are preferably lapped and welded together.

I claim as my invention:

1. A tire-armor, comprising overlapping tread and side plates extending continuously around the armor and slidable laterally on one another, means for loosely connecting adjoining plates, annular base plates spaced from the adjacent side plates, flexible connections between said base plates and the adjacent side plates, and a covering strip extending over said flexible connections.

2. A tire-armor, comprising an annular tread plate, annular side plates connected with said tread-plate to slide laterally thereon, base plates, extensible connections between said base plates and the adjacent side plates, and stop means for limiting the expansive movement of said side plates relative to said base plates.

3. A tire-armor, comprising an annular tread plate, annular side plates connected with said tread-plate to slide laterally thereon, base plates, extensible connections between said base plates and the adjacent side plates, and a covering strip for said connections overlapping said base plate and the adjacent side plate and having one edge attached to one of said last-named plates and its other edge slidingly connected with the other of said plates by a pin and groove, said groove being arranged radially of said plate.

MICHAEL J. GILLICE.